(12) United States Patent
Drisdelle et al.

(10) Patent No.: US 7,785,379 B2
(45) Date of Patent: Aug. 31, 2010

(54) AGRICULTURAL FIBRE FUEL PELLETS

(75) Inventors: Mark Drisdelle, Hudson (CA); Claude Lapointe, Blainsville (CA)

(73) Assignee: Evergreen BioFuels Inc., Boisbriand (CA)

( * ) Notice: Subject to any disclaimer, the term of this patent is extended or adjusted under 35 U.S.C. 154(b) by 0 days.

(21) Appl. No.: 11/985,564

(22) Filed: Nov. 15, 2007

(65) Prior Publication Data
US 2008/0172933 A1    Jul. 24, 2008

Related U.S. Application Data

(63) Continuation of application No. PCT/CA2006/000791, filed on May 16, 2006.

(60) Provisional application No. 60/681,048, filed on May 16, 2005.

(51) Int. Cl.
*C10L 5/44* (2006.01)
(52) U.S. Cl. .......................................... 44/535; 44/589
(58) Field of Classification Search .................... 44/535
See application file for complete search history.

(56) References Cited

U.S. PATENT DOCUMENTS

| | | | | |
|---|---|---|---|---|
| 4,015,951 A | | 4/1977 | Gunnerman | 44/10 |
| 4,236,897 A | * | 12/1980 | Johnston | 44/530 |
| 4,324,561 A | | 4/1982 | Dean et al. | 44/10 |
| 4,529,407 A | | 7/1985 | Johnston et al. | 44/21 |
| 4,828,573 A | | 5/1989 | Jelks | 44/15 |
| 5,342,418 A | | 8/1994 | Jesse | 44/589 |
| 5,375,540 A | | 12/1994 | Verrecchia et al. | 110/257 |

FOREIGN PATENT DOCUMENTS

| | | | |
|---|---|---|---|
| CA | 2273321 | | 11/1999 |
| CA | 2467606 A1 | * | 11/2004 |
| EP | 507897 | | 3/1994 |
| WO | WO79/00988 | | 11/1979 |

OTHER PUBLICATIONS

Miles et al, "Alkali Deposits Found in Biomass Power Plants—A Preliminary Investigation of the Extent and Nature", National Renewable Energy Laboratory, Apr. 15, 1995.*

* cited by examiner

*Primary Examiner*—Glenn A Caldarola
*Assistant Examiner*—Ming Cheung Po
(74) *Attorney, Agent, or Firm*—Henneman & Associates, PLC; Larry E. Henneman, Jr.

(57) ABSTRACT

A method of preparing fuel pellets includes the steps of providing a feedstock in the form of agricultural hull fibres. The agricultural hull fibres may be derived from all whole grains and seeds. For example, are comprised of at least one of corn bran, rye bran; oat bran, rice bran, soy bran, canola bran and wheat bran. The method may include the step of mixing the feedstock with a sequestering agent before being formed into pellets for sequestering alkali metal vapors and raising the fusion point of the inorganic elements during combustion of the pellets. The sequestering agent may be calcium carbonate added in amounts up to about 0.5% by weight. The pellets contain additives comprised of ammonium nitrate, calcium, manganese, magnesium, aluminum, barium, iron, potassium and amorphous silicate, which sequester potassium and chlorides.

23 Claims, No Drawings

AGRICULTURAL FIBRE FUEL PELLETS

RELATED APPLICATIONS

This application is a continuation of International Application No. PCT/CA2006/000791, filed on May 16, 2006 by the same inventors, which claims the benefit of U.S. Provisional Patent Application No. 60/681,048, filed on May 16, 2005, by the same inventors, each of which is incorporated herein by reference in its entirety.

BACKGROUND OF THE INVENTION

This invention relates to fuel pellets produced from biomass material, in particular agricultural fibre.

There is a growing interest in biomass materials, such as wood, wood byproducts, annual plants, etc. as a source of energy. For instance, wood residues such as sawdust are quite widely available in the form of small pellets. Wood residues from sawmills and wood processing industries typically have less than 1% mineral content. Wood comprises primarily three structural components: Cellulose (45-50% by weight), hemicelluloses (20-25%), and lignin (20-30%). Cellulose is a long, straight chain homopolymer (d.p. 5,000-10,000) consisting of anhydro d-glucopyranose linked via [beta] 1,4 glycosidic bonds. Hemicelluloses have a lower degree of polymerization (150-200) and may be relatively straight or branched. These consist variously of five- and six-carbon sugars. Although the type and amount of hemicellulose in wood varies with species, most hardwoods have a predominance of glucuronoxylan, consisting of a linear backbone of xylopyranose with a 4-0-methylglucuronic acid residue on approximately 10% of the xylan rings. Softwoods primarily contain galactoglucomannan consisting of [beta]-D-mannopyranose, [beta]-D-glucopyranose, and [alpha]-D-galactopyranose. Cellulose and hemicelluloses contain free hydroxyl groups that lend wood its inherent hygroscopicity. Lignin is a large, amorphous polymer consisting of varying ratios of the phenyl propane precursors linked mainly (>$2/3$) by ether bonds and the rest by C—C bonds.

Other materials such as alfalfa, switch grass, etc. have been studied as energy sources in the form of pellets. There are a number of advantages to biomass fuel pellets including, low levels of dust, free flowing material, high energy density and uniform burning rate. In order to meet the requirements of a first quality pellet fuel, the pellets must contain less than about 1% by weight ash and have a heat output of at least 8,000 BTU per pound of fuel.

The exterior protective surface of whole grains, seeds, fruits and nuts typically have what is called a hull or shell, sheath or husk and may be referred to as the bran of the whole grain and seed e.g., corn bran, oat bran, rice bran, soy bran.

When comparing the energy content at the Bodycote testing labs at Pointe Clair Quebec, the hulls from corn kernels, oats, soybean, canola, wheat, barley for example, were found to be comparable to wood biomass, typically in the range 7,000 to about 9,000 btu's per pound (dry basis). In fact the oil seeds far exceeded this level reaching over 12,000 BTU's per pound of fuel.

The moisture content of most of the hulls derived from whole grains and seed is typically between 7 and 26% mc, depending on the type of processing employed in the harvesting and processing. Typical field dried seeds and whole grains could be lower in moisture content. If they are harvested at below 16% moisture content, they may not require additional drying, otherwise they are susceptible to the formation of mold during storage.

The wet milling of corn for the production of ethanol for example, produces corn fiber. This is usually dried in a rotary drum dryer and mixed with what is called a syrup (the protein content derived from the fermentation process) and is sold as an animal feed called DDG's (dried distillers grains). This process is very similar to the production of value added food grade products, also derived from the wet milling of corn. These products include corn sweeteners and corn starch used in a multitude of food preparation applications. This process also produces fibre and protein (steep water) which are mixed together and sold as animal feed.

The major difference between the agriculture and wood based materials were in the mineral content and type as a percentage. In the case of corn bran, the ash or mineral content can be below 1% by weight or as high as 7% or more for oat hulls and as high as 20% or more for rice hulls.

Verrecchia et al. U.S. Pat. No. 5,375,540 describes a combustion system capable of burning fuel pellets and also discusses the problems associated with trying to burn many natural biomass materials, including whole corn. The inventors acknowledge that these fuels present a serious problem of clinker formation from ash. They attempted to solve the problem by modifying the design of the burner.

Clinkers refer to the formation of lava-like pieces formed in the fire pot of pellet stoves. These are formed when minerals and salts contained in the pellets are exposed to the high burning temperatures of the pellets. The process is known as ash fusion. Alkali in the ash of annual crop biomass fuels can create a serious fouling problem and a particularly troublesome alkali is potassium.

Another difficulty with biomass fuel pellets is the formation of pellets that will resist crumbling. Some wood components are capable of self bonding during the pelletizing process, while other woods require the addition of a binding agent. Many other natural cellulosic materials, such as agricultural wastes also require an additional binding agent. Other differences between wood biomass and agriculture fibre is the hemicellulose as a percentage, with agriculture hulls usually containing higher levels. The hulls of agriculture materials usually contain varying levels of hemicellulose 12% to about 40% and corn bran has one of the highest levels typically 30%-40% or more. Hemicellulose is similar to cellulose but is less complex and is the second most abundant polysaccharide in nature. Hemicellulose consists mainly of sugars and sugar acids and can be found in wood or corn fibers.

Lignin is the binder that flows during the production of wood pellets, the hemicellulose remains bound in the cell wall. Because there is a lower level of Lignin in the hulls of agriculture fibers, binder additives must be used to produce good quality, stable pellets. This is undesirable because the binding agents raise the cost and they may include components that when burned form atmospheric pollutants and or promote clinker formation. In Johnston et al. U.S. Pat. No. 4,529,407, as well as in Jesse U.S. Pat. No. 5,342,418, pellets are made from a mixture of natural cellulosic material, such as bark mixtures, and a synthetic polymeric thermoplastic material as the pellet forming feedstock. There are many examples of the use of such thermoplastic materials to bind together the cellulosic particles which make up the final pellet.

Like starch, fiber is made up of carbohydrate polymers with sugars as their basic building blocks, but the structure of fiber is more varied and complex. Cellulose is an insoluble fiber that resembles amylose starch with its linear structure of D-glucose units, but is formed by beta-instead of alpha-1,4 linkages. Hemicellulose is a general term for the noncellulose fiber fraction of plant cell walls. The basic structure of hemicellulose is a main chain with side chains attached, both of which can be made from a variety of five and six carbon sugars. Pentosans are the part of the hemicellulose fraction where the main chain is made up of five carbon sugars, usually D-xylose. Pentosan fractions can be soluble or insoluble, depending among other factors on their degree of polymerization. The hemicellulose fraction is usually described as insoluble.

Fiber is what gives plant foods structure and varying textures. Fiber comes in two forms, each with its own important qualities. Soluble fiber, so named because it can dissolve in water, is made of pectins, gums, and mucilages. Insoluble fiber does not dissolve in water and consists of cellulose, hemicellulose, and lignins. Most foods contain both types of fiber, although some foods are more predominant in one form.

The hulls of typical whole grains and seeds like soybeans, represent about 8 to 10% of the weight of soybean grain (Sessa and Wolf, 2001; R. Glahn, personal communication). In the case of the Soybean, Mullin and Xu (2001) reported the following major constituents of the hulls, on a dry weight basis:

| cellulose | 14 to 25 g/100 g |
| hemicellulose | 14 to 20 |
| pectin | 10 to 12 |
| protein | 9 to 12 |
| uronic acid | 7 to 11 |
| ash | 4 to 5 |
| lignin | 3 to 4 |

Thus soybean hulls, though high in fiber, are a significant source of protein, comparable to corn grain in the amount of crude protein.

The primary use for soybean hulls is feed. Hulls are routinely removed during crushing of soybeans but are returned to the processing stream to be added to the meal fraction. The meal fraction which contains most of the protein, adds as much as 4%-5% or more of ash to the final end product. In the case of corn bran the steep water added over 6% to the ash content of the final material (Bodycote 2001 test report). Excess hulls may be sold as feedstuffs or discarded as waste. Removal of hulls costs processors 5 to 10 cents per bushel.

In the corn wet milling process, the yellow skin of the corn kernel is dissolves off during the process creating fiber and a steep (protein) liquid. The steep and corn bran as two separate streams are recombined at about a 70% fiber to 30% steep protein. This also increases the ash content, so that these pellets can not be used in typical pellet stove combustion processes. The higher the chlorides and potassium salts, the higher the occurrence of clinkering during the combustion process. Potassium and Chlorides as well as other minerals are apparently tied up as organically bound elements, or in forms that are readily volatilized during combustion. A portion of the potassium occurs as dissolved salts in inherent moisture, cations attached to carboxylic and other functional groups, complex ions, and chemisorbed material. A substantial fraction (15%-40%) of this potassium volatilizes during combustion (Baxter 1994). They act as the glue that holds silica to silica, forming a mass of slag or clinker, which leads to a host of other negative combustion issues.

It is an object of the present invention to develop fuel pellets from natural biomass materials which will be high quality pellets produced without the need for additional bonding agents such as polymeric thermoplastic materials or special combustion apparatus to handle ash fusion issues

SUMMARY OF THE INVENTION

Accordingly, the present invention provides a method of preparing fuel pellets from a feedstock comprising agricultural hull fibres. These hull fibres typically have a moisture content of about 10 to 16%. The hull fibre feedstock is compressed and extruded in a dye of a palletizing machine to obtain fuel pellets having diameters of about ⅜ inch to ½ inch. These pellets have an ash content of less than 1% by weight and a heat output of about 8,000 BTU per pound of fuel on a dry basis.

According to a further aspect the present invention provides a method for preparing fuel pellets from a feedstock in the form of corn fibres or bran obtained from the wet or dry milling of corn. These corn fibres typically have a moisture content of about 10 to 16%. The corn fibre feedstock is compressed and extruded in a dye of a pelletizing machine to obtain fuel pellets having diameters of about ⅜ inch to ½ inch or more. These pellets have an ash content of less than 1% by weight and a heat output of at about 8000 BTU per pound of fuel on a dry basis.

Still another aspect of the present invention provides a method of preparing fuel pellets that includes the steps of providing a feedstock in the form of agricultural hull fibres having a moisture content of about 10 to about 16% and compressing and extruding the agricultural fibre feedstock through a die to obtain fuel pellets in the form of small cylinders having a diameter of about ⅜ inch to ¾ inch or more. Additionally, the pellets have an ash content of about 1.1% to about 20% by weight and a calorific value of about 7,000 BTUs per pound of fuel on a dry basis.

The corn fibres used as feedstock for this invention is a typical corn bran that is obtained from wet or dry milling of corn. During the corn milling process the corn separates into four main parts, namely starch, germ, fibre and protein. The fibre part is corn bran which is an excellent source of dietary fibre. Large quantities of corn bran are available from corn processing.

With increasing demand for alternative energy sources, new ethanol plants are being brought into operation. A byproduct of these plants is corn bran.

An important advantage of corn bran as a feedstock for fuel pellets is that during the corn milling process substantially all of the water soluble alkalis in the corn bran are removed. This results in the very low ash content of less than 1% in the corn bran.

Corn bran has also been found to be a material which behaves exceptionally well during the formation of the pellets. Thus, corn bran have characteristics that are typical of juvenile fibre, such as found in alfalfa, which allows for exceptionally high throughputs compared to feedstocks based on wood fibre. For example, this corn bran can be fed at a rate of more than 100 pounds per horsepower of extrusion energy consumed.

Since the corn bran may contain some residual alkali metals, it is advantageous to mix a sequestering agent with the corn bran which sequesters alkali metal vapors during combustion of the pellets. A typical additive for this purpose is calcium carbonate which is typically added in an amount of less than about 0.5% based on the corn bran feedstock.

In addition to the calcium carbonate, the addition of sodium bicarbonate in the presence of the following mixture has been found very effective. The silicate is amorphous and the additive is blended into the fibre prior to extrusion or onto the pellets after extrusion at about 25% and 2% or more by weight depending on the make up of the material being pelletized.

| | |
|---|---|
| Ammonium nitrate | 33.3 |
| Calcium (as CaO) | 0.7 |
| Manganese (as MnO—)) | 10.9 |
| Magnesium (as MgO) | 11.3 |
| Aluminum (as Alz0$_3$) | 1.1 |
| Barium (as BaO) | 0.2 |
| Iron (as Fe—)0$_3$) | 1.9 |
| Potassium (as K$_2$O) | 0.6 |
| Silicate | 38.7 |

An independent lab report from SGS of Sydney Nova Scotia shows the ash sample containing the additive raised the melting point of initial deformation from 1254 C to 1377 C and as high as 1395 C from 1310 C Another independent lab report from Dr Ben Anthony a Federal Government Research scientist at CANMET Natural Resources Canada, demonstrates the effective sequestration of chlorides during combustion of high ash fuel pellets.

It has also been found to be advantageous to condition the corn bran feedstock with steam before it enters the pellet mill, e.g. steam at a temperature of about 160 F to about 300° F. or more depending on the cell structure of the agriculture fibre. This preconditioned corn bran when extruded through the die of the pellet mill shows the excellent bonding characteristics of the fibre without the addition of additional binding agents. Thus, the pellets obtained are all substantially pure natural material.

The die used for producing the pellets from corn fibre typically has a L:D ratio of about 12:1 to 1:1 with a diameter of about 1/16 inch to 1/2 inch and a thickness of about 2.5 inches to 3.5 inches. The L over D ratio will vary, depending on the type of fibre being extruded. The high pressure compression of the extrusion through the die raises the temperature of the feedstock to at least about 130° C. or more. The corn bran feedstock has a typical bulk density of about 11 to 16 pounds per cubic foot, while the pellets obtained have a bulk density of about 30 to 70 pounds per cubic foot, preferably about 50 to 70 pounds per cubic foot. The formed pellets have a typical moisture content of about 3 to 10% or more.

A useful machine for producing the fuel pellets according to this invention is a California Pellet Mill. These pellet mills are available from two HP laboratory models to 300 HP or more.

DESCRIPTION OF THE PREFERRED EMBODIMENTS

Example 1

Samples of corn were obtained from U.S.A. and Quebec, Canada. These samples had the following properties:

| | U.S. Corn | Quebec Corn |
|---|---|---|
| Humidity - % | 13.87 | 11.13 |
| Ash - % | 1.41 | 1.23 |
| Water soluble sodium - mg/kg | 30 | 25 |
| Water soluble chloride - mg/kg | 580 | 495 |
| Water soluble potassium | 3060 | 3160 |

Example 2

A sample of commercial corn bran was obtained from the Casco division of Corn Products International. This had been produced by a routine commercial corn wet milling process. The corn bran had an ash content of 0.73% and a calorific value of 8365 BTU/lb.

This corn bran was made into pellets using a two HP laboratory model California Pellet Mill. The die used had a diameter of 1/8 inches and a length of 2.5 inches, and produced cylindrical pellets having a diameter of 1/4 inches and a length of 3/4 inches.

The pellets were combusted in a pellet stove which was highly sensitive to high ash fuels pellets, containing higher levels of alkali metals like potassium and chlorides. Each stove was charged with 40 pounds of the pellets and no clinkers were formed during combustion of the fibre pellets.

Example 3

A pelleting trial on 13MT of corn fiber was run (approximately 9.6% moisture and 7 kg/ft3 bulk density) using the CPM 3000 with die SN 83992 (040W560) (spec. 5/32"×2 3/8"× VR (4)) and a combination CCE and helical CE shell. The die was only 1-2 weeks old. Outside temperature was 4° C. and the product temperature was approximately 17° C. They ran with the rolls a bit further from the die face than normally for feed. The mill ran very smoothly and they were able to pelletize easily at temperatures of 100° C. They ran at 100% feeder speed which gave us approximately 4.5MT/Hr through-put and 75% amp load. A large die/low horsepower pellet mill set up would be important to consider. Note that by going to a 1/4 inch pellet, the open area of the die will increase and for a given die at the same time capacity the dwell time will automatically increase (approximately 10%). A 22.5" diameter die or even 26" would also contribute to better pellet quality. The remote roll feature could possibly add flexibility in order to further improve pellet quality.

The maximum pellet quality that they were able to achieve was 88 pdi using the standard feed pellet quality test (Borregaard pneumatic test). This reference should be used only for a basis of comparison. Note that pellets were always short (i.e., 1/4 inch) after the test. These short pellets are a result of breakage along "shear planes" which are quite evident with fibrous material. Grinding of the incoming material could be tested in order to see the effect on durability. The shear planes are also evident by the fact that the maximum pellet length (not using knives) was approximately 3/4 inch to 1 inch. It is their opinion that the pellet quality following these tests is acceptable to begin burn trials but that much work is yet to be done in order to improve the pellet durability. Further "trial and error" tests were required in order to see the effect of die speed, dwell time, moisture addition (through steam), grind size, binder requirements, die relief, roll positioning, secondary steam pressure, super heated steam, etc. Our short test did not permit us to conclude on most of these matters.

We did find that:

A) Product accepts all the steam we can give.

B) At approximately 180 degrees Fahrenheit the amps show a significant drop (i.e. 15-20%). This is due to the release, flow and polymerization of the hemicellulose a significant occurrence in terms of increasing through put, product durability and moisture resistance once in a pellet form. So what has been established, is that the hemicellulose is being released at about 150 degrees Fahrenheit or more and about 260 F or more.

C) The delta temperature through the die significantly drops as we go beyond 180 degrees Fahrenheit.

Conditioning time is also important and it is evident that residency time, temperature and surface are exposure to the steam is equally important.

What is claimed is:

1. A method of preparing fuel pellets comprising the steps of:
   providing a feedstock in the form of agricultural whole grain and seed hull fibres having a moisture content of about 10 to about 16%;
   mixing an additive mixture with the feedstock; and
   compressing and extruding the agricultural fibre feedstock through a die to obtain fuel pellets in the form of small cylinders having a diameter of about 3/8 inch to 3/4 inch or more, said pellets having an ash content of about 1.1% to about 20% by weight and a calorific value of about 7,000 BTUs per pound of fuel on a dry basis; and wherein
   the additive mixture is comprised of ammonium nitrate, calcium, manganese, magnesium, aluminum, barium, iron, potassium and amorphous silicate; and
   the additive mixture sequesters potassium and chlorides and raise the fusion point of the inorganic elements in the feedstock during combustion of the pellets.

2. A method according to claim 1 wherein the agricultural hull fibres derived from all whole grains and seeds are comprised of at least one of corn bran fibre, rye bran fibre; oat bran fibre, rice bran fibre, soy bran fibre, canola bran fibre (rape seed) and wheat bran fibre.

3. A method according to claim 1 including a step of pre-treating the agricultural whole grain and seed hull fibre feedstock with high temperature steam before being formed into pellets.

4. A method according to claim 3 wherein the pre-treating step is at a sufficient temperature and sufficient time to activate hemicellulose within the fibre as a binding agent.

5. A method according to claim 1 wherein the step of mixing the additive mixture with the agricultural whole grain and seed hull fibre feedstock includes mixing the feedstock with a sequestering agent before compressing and extruding the feedstock into pellets, the sequestering agent for sequestering alkali metal vapors and raising the fusion point of the inorganic elements during combustion of the pellets.

6. A method according to claim 5 wherein the sequestering agent is calcium carbonate.

7. A method according to claim 6 wherein the calcium carbonate is added in amounts up to about 0.5% by weight.

8. A method according to claim 1 wherein the temperature is raised to at least about 130° C. or more during extrusion of the agricultural whole grain and seed hull fibre feedstock through the die.

9. A method according to claim 1 wherein the agricultural whole grain and seed hull fibres forming the feedstock have a length of less than about 3/4 inch.

10. A method according to claim 1 wherein the pellets have a length of less than about 2 inches.

11. A. method according to claim 1 wherein the pellets have a moisture content in the range of about 3 to about 10%.

12. A method according to claim 1 wherein the agricultural hull fibre feedstock has a bulk density of about 11 to about 16 pounds per cubic foot.

13. A method according to claim 1 wherein the pellets obtained have a bulk density of about 40 to 70 pounds per cubic foot.

14. A method according to claim 1 wherein pellets are obtained containing less than about 300 ppm of water soluble chlorides that are sequestered during combustion of the fuel pellets.

15. A method according to claim 1 wherein the agricultural hull fibre pellets are formed at a throughput of feedstock of at least 100 pounds per hour per horsepower of extrusion energy consumed.

16. A fuel pellet derived from the fibres of whole grains and seeds comprising:
   agricultural hull fibres;
   a binding agent including steam activated hemicellulose;
   a sequestering agent to control alkali metal vapors; and
   an additive mixture to alter the fusion point of the inorganic elements; and wherein
   the pellets contain the additive mixture comprised of ammonium nitrate, calcium, manganese, magnesium, aluminum, barium, iron, potassium and amorphous silicate, which sequester potassium and chlorides and alter the fusion point of the inorganic elements present in the fuel.

17. A fuel pellet according to claim 16 wherein the sequestering agent is calcium carbonate 18. A fuel pellet according to claim 17 wherein the calcium carbonate is added in amounts up to about 0.5% by weight.

19. A fuel pellet according to claim 16 wherein the agriculture fuel pellets from hull fibres have a length of about 3/4 inch.

20. A fuel pellet according to claim 16 wherein the pellets have a length of less than about 2 inches.

21. A fuel pellet according to claim 16 wherein the pellets have a moisture content in the range of about 3 to 12%.

22. A fuel pellet according to claim 16 wherein the pellets obtained have a bulk density of about 40 to 70 pounds per cubic foot.

23. A fuel pellet according to claim 16 wherein pellets are obtained containing less than 300 ppm of water soluble chlorides.

* * * * *